United States Patent Office

2,810,653
Patented Oct. 22, 1957

2,810,653

COLORING COMPOSITION FOR HECTOGRAPH INKS

William W. Ranson, Woodstown, N. J., assignor to E. I. du Pont de Nemours and Company, Wilmington, Del., a corporation of Delaware No Drawing. Application December 27, 1954, Serial No. 477,945

5 Claims. (Cl. 106—22)

This invention relates to the preparation of novel compositions comprising crystal violet and long chain aliphatic ketones, and to their use in the production of hectograph ink compositions which, by virtue of the presence of said ketones, exhibit improved working qualities coupled with good strength.

Primarily, the problem which this invention seeks to solve is that of reducing the viscosity of hectograph inks and of stabilizing the viscosity of such inks when they are held at elevated temperatures. A secondary problem is that of providing hectograph inks of desirable viscosity and suitable for use on carbon paper which is adapted for the production of a limited number of copies, e. g., about 50 strong, sharp copies.

In order to place these problems in their proper perspective it is desirable to review briefly some of the practices of the ink makers.

Normally, the ink maker receives dyes, such as crystal violet, in powder form. The dry color is incorporated into a suitable hectograph ink vehicle, as illustrated in Example 7 hereinbelow. The vehicle contains waxy solids and for this reason is melted, to facilitate incorporation of the color. The resulting ink, accordingly, must be kept in a fluid condition while it is applied to papers for the manufacture of carbon paper. During the application process therefore, the ink is maintained at a temperature of about 85° C. Since the ink pan in the coating machine may hold a day's supply of ink, it is clear that maintenance of the ink at this elevated temperature may be extended to 8 hours or more.

Now although crystal violet is for various reasons one of the preferred colors used in making inks for coating hectograph paper, it has the drawback that it produces inks of undesirably high initial viscosity, which viscosity generally increases further as the ink is held molten at the mentioned temperature. This continued increase in viscosity may be due in part to a progressive crystal change in the color, and in part to the nature of the vehicle employed. Although heating to still higher temperatures tends to decrease viscosity, the maximum temperature permitted in practice is about 85° C., due to decomposition of the dye.

It is clear that for best applicability in practice, it is desirable to have an ink which has a satisfactory initial viscosity, and in which the viscosity does not tend to increase as the ink is held at coating temperature (about 85° C.) for several hours. Yet, addition of softeners or plasticisers freely is not permissible, because it is essential that the coating produced upon hectograph paper shall not be too sticky or soft upon cooling.

Now according to my invention, the above problem is solved, in an unforeseen manner and to a satisfactory degree, by admixing with the color a dialkyl ketone having at least one straight chain of 7 or more C-atoms. More particularly, I admix with crystal violet a compound of the general formula R—CO—$R_1$, wherein R represents an alkyl group having from 7 to 21 carbon atoms, while $R_1$ is an alkyl radical of from 1 to 21 carbon atoms. The quantity of the added ketone may vary from one to about 45% by weight of the dry color.

I find that coloring compositions of the aforementioned type give, with the customary waxy ink-vehicles, a coating ink of very good initial working qualities. I find, furthermore, that these good working qualities do not become seriously impaired when the ink is held at coating temperature (about 85° C.) for a number of hours, say up to 12 hours. Finally, I find that the coating on hectograph paper produced from the resulting ink is not soft or sticky, and does not differ in aging characteristics or other practical qualities from coatings produced by the use of crystal violet alone.

An incidental advantage of my novel coloring composition is that it is excellently adapted for the production of "short-run" copy paper.

By "short-run" paper, the trade refers to hectograph paper which is intended to give a limited number of relatively strong copies, e. g., 50 sharp copies. For such a purpose, the use of an excessive concentration of dye in the coating ink would be wasteful. On the other hand, adjustment of the ink concentration to adapt it for "short-run" papers is often accompanied with a number of difficulties, for instance: (a) viscosity, (b) appearance on the carbon paper, (c) maintenance of uniform shade throughout a given run of copies, (d) maintenance of copy intensity, etc. Copy intensity is a function of the rate at which the coating dissolves in alcohol, and this rate is affected by the composition of the ink vehicle. Ordinarily, free variation of the color intensity by addition of inert or non-coloring ingredients is not permissible, because of the tendency of the added material to increase the ink viscosity. It is accordingly both gratifying and surprising to find that the novel coloring compositions of this invention are excellently adapted for producing short-run coatings upon hectograph paper, without introducing any of the difficulties aforementioned.

The admixing of the dialkyl ketone with the color may be achieved by grinding the two together in a convenient mill or mixing device. The two components may also be added separately, in either order, to the molten wax in the process of preparing the coating ink. Prior intermixing of the color and ketone, however, has the advantage of offering the hectograph paper manufacturer a ready preparation suitable for direct use, without troublesome calculations and weighings.

Without limiting my invention, the following examples are given to illustrate my preferred embodiments thereof. Parts mentioned are by weight.

Example 1

Mix together by dry grinding in a micropulverizer hammer mill 98.5 parts of crystal violet (Col. Ind. 681) and 1.5 parts of commercial stearone (essentially, 18-pentatriacontanone: $C_{17}H_{35}$—CO—$C_{17}H_{35}$).

When blended with a hectograph vehicle, as for instance in Example 7 below, the above composition yields a coating ink of lower viscosity than an ink containing crystal violet alone. Moreover, the viscosity does not increase to any objectionable degree as the ink is held at a temperature of 85° C. for periods of time up to 12 hours.

Example 2

Mix together, as in Example 1, 97 parts of crystal violet and 3 parts of 10-nonadecanone:

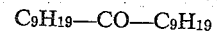
$C_9H_{19}$—CO—$C_9H_{19}$

The ink-making properties of the resulting composition are essentially the same as in Example 1.

Similar results are also obtained by using in the same formulation, in lieu of the ketone named above, any of the following:

- Laurone (12-tricosanone: $C_{11}H_{23}$—CO—$C_{11}H_{23}$)
- 14-heptacosanone ($C_{13}H_{27}$—CO—$C_{13}H_{27}$)
- Palmitone ($C_{15}H_{31}$—CO—$C_{15}H_{31}$)
- Behenone ($C_{21}H_{43}$—CO—$C_{21}H_{43}$)

*Example 3*

Mix together, as in Example 1, 86.5 parts of crystal violet, 7.5 parts of commercial stearone and 6.0 parts of a light lubricating oil (e. g., petroleum, S. A. E. #30). When 57 parts of this composition are milled on an ink mill in admixture with 43 parts of a waxy hectograph vehicle (or mixture of waxy vehicles, as in Example 7 below), a coating ink results of low initial viscosity, the latter quality being stable at coating temperature for several hours.

Similar results are obtained if the lubricating oil in the above example is replaced by an equal weight of an inert diluent, for instance, dextrin.

*Example 4*

Mix together, as in Example 1, 97 parts of crystal violet and 3 parts of coconone (a commercial mixture of aliphatic ketones derived from coconut oil acids). The resulting composition produces a hectograph coating ink of lower viscosity than when crystal violet is used alone.

*Example 5*

Mix together, by dry grinding in an attrition mill 69 parts of crystal violet and 31 parts of stearone. The resulting composition, when milled into a hectograph vehicle, produces an ink of extremely low viscosity.

*Example 6*

Mix together, as in Example 5, 97 parts of crystal violet and 3 parts of 2-nonone: $CH_3$—CO—$C_7H_{15}$. When milled into a hectograph vehicle by standard procedure, this composition forms an ink with considerably lower viscosity than can be obtained with crystal violet alone. The ink obtained not only does not thicken upon holding for several hours in the molten state, but actually decreases in viscosity in course of time. This low ink viscosity permits faster application of the ink to paper and affords more uniform carbon coatings than those produced by any other known method.

Other unsymmetrical ketones which may be used in the above example include

- 2-undecanone ($CH_3$—CO—$C_9H_{19}$)
- 2-tridecanone ($CH_3$—CO—$C_{11}H_{23}$)
- 2-heptadecanone ($CH_3$—CO—$C_{15}H_{31}$), and
- 2-nonadecanone ($CH_3$—CO—$C_{17}H_{35}$)

In lieu of crystal violet in the above examples, mixtures thereof with minor quantities of methyl violet (as often added for shading purposes) may be employed. Such minor quantities may be anywhere from 0 to 5%.

The following additional example will illustrate the procedure of incorporating my novel coloring compositions into hectograph-ink vehicles.

*Example 7.—Preparation of ink*

A suitable hectograph vehicle, for the purposes mentioned in the above examples, is prepared as follows:

Mix together the following ingredients at about 85° C.

| | Parts |
|---|---|
| Lanolin (anhydrous) | 9.5 |
| Carnauba wax (No. 3 yellow) | 23.3 |
| Mineral oil (S. A. E. white oil No. 50) | 45.7 |
| Blown castor oil (grade A) | 19.0 |
| White paraffin wax (melting range 140°–150° F.) | 2.5 |
| Total | 100.0 |

Blend well, by agitation at 80 to 90° C., 43 parts of this melted vehicle and 57 parts of the ketone-dye mixture obtained in any of the above examples. Then mill the ink blend on a standard ink mill (or a standard ball mill) until the desired particle size and consistency are achieved. The hectograph ink so obtained is then used for coating paper stock, by well-known methods, to form the carbon papers.

In addition to the advantage of good working properties, coating inks prepared with the novel coloring compositions of this invention are characterized by high tinctorial strength, often exceeding in this respect certain commercial products now on the market. Other advantages of my invention will be readily apparent to those skilled in the art.

I claim:

1. A coloring composition for hectograph ink, consists essentially of a triarylmethane color consisting predominantly of crystal violet and an aliphatic ketone of the formula R—CO—$R_1$, wherein R represents an alkyl radical of 7 to 21 carbon atoms, while $R_1$ is an alkyl radical of from 1 to 21 carbon atoms, the proportion of said ketone being not less than 1% of the weight of said triarylmethane color.

2. A coloring composition for hectograph ink, consisting essentially of crystal violet and a dialkyl ketone having at least one straight chain of at least 7 carbon atoms, the proportion of said ketone being from 1 to 45% of the weight of the crystal violet.

3. A coloring composition for hectograph ink, consisting essentially of crystal violet and a symmetrical dialkyl ketone whose alkyl radicals contain from 7 to 21 carbon atoms each, the proportion of said ketone being from 1 to 45% of the weight of the crystal violet.

4. A coloring composition for hectograph ink, consisting essentially of crystal violet and stearone, the proportion of the latter being from 1 to 45% by weight based on the weight of the crystal violet.

5. A hectograph ink consisting essentially of a hectograph-ink vehicle, a triarylmethane color consisting predominantly of crystal violet and an aliphatic ketone of the formula R—CO—$R_1$, wherein R represents an alkyl radical of 7 to 21 carbon atoms, while $R_1$ is an alkyl radical of from 1 to 21 carbon atoms, the proportion of said ketone being from 1 to 45% by weight based on the weight of said triarylmethane color.

References Cited in the file of this patent

UNITED STATES PATENTS

| | | |
|---|---|---|
| 2,211,687 | Brooks | Aug. 13, 1940 |
| 2,271,112 | Bjorksten | Jan. 27, 1942 |
| 2,377,172 | Murphy | May 29, 1945 |
| 2,686,204 | Watson | Aug. 10, 1954 |

OTHER REFERENCES

Warth: "The Chemistry and Technology of Waxes," Reinhold 1947 (pages 258, 281, 282).

Bennett: "Commercial Waxes," Chemical Pub. Co., 1944 (pages 133, 135).